US007324420B2

(12) United States Patent
Lee et al.

(10) Patent No.: US 7,324,420 B2
(45) Date of Patent: Jan. 29, 2008

(54) OPTICAL DISC AND METHOD OF IDENTIFYING RECORDING LAYER

(75) Inventors: Kyung-geun Lee, Gyeonggi-do (KR);
In-sik Park, Gyeonggi-do (KR);
Byoung-ho Choi, Gyeonggi-do (KR);
Du-seop Yoon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/204,357

(22) Filed: Aug. 16, 2005

(65) Prior Publication Data

US 2005/0270932 A1 Dec. 8, 2005

Related U.S. Application Data

(63) Continuation of application No. 10/099,946, filed on Mar. 19, 2002.

(30) Foreign Application Priority Data

Apr. 7, 2001 (KR) ............................... 2001-18472

(51) Int. Cl.
*G11B 7/00* (2006.01)
(52) U.S. Cl. .................. 369/53.29; 369/275.4
(58) Field of Classification Search .................. 369/94, 369/111, 53.29, 47.54, 30.1, 275.3, 53.1, 369/47.1, 275.4
See application file for complete search history.

(56) References Cited

U.S. PATENT DOCUMENTS 5,881,032 A * 3/1999 Ito et al. .................... 369/30.1

| 5,995,458 A | 11/1999 | Itoi |
| 6,002,655 A | 12/1999 | Ono et al. |
| 6,317,403 B1 | 11/2001 | Ono et al. |

(Continued)

FOREIGN PATENT DOCUMENTS

CN 1247622 3/2000

(Continued)

OTHER PUBLICATIONS

Japanese Office Action issued May 23, 2006 by the Japan Patent Office re: Japanese Application No. 2002-105750.

(Continued)

*Primary Examiner*—Wayne Young
*Assistant Examiner*—Adam R. Giesy
(74) *Attorney, Agent, or Firm*—Stein, McEwen & Bui, LLP

(57) ABSTRACT

An optical disc in which a physical address of each smallest recording unit and a recorded address increase or decrease on first and second recording layers, and a method of identifying the recording layers. Embodiments are provided for discs having first and second recording layers with a same or an opposite track spiral direction. Physical addresses of the smallest recording units and a recorded address are increased or decreased between an inner radius and an outer radius of a recording layer in a manner which enables a reproducing and/or a recording device to more rapidly reproduce and/or record data on the disc. A physical address of the smallest recording units on the first recording layer is made different from a physical address of the smallest recording units on the second recording layer.

35 Claims, 10 Drawing Sheets

U.S. PATENT DOCUMENTS 6,370,091 B1   4/2002   Kuroda
6,643,231 B2   11/2003  Ono et al.
6,850,469 B2   2/2005   Ogawa et al.

FOREIGN PATENT DOCUMENTS

| JP | 5-282791    | 10/1993 |
| JP | 2000-285607 | 10/2000 |
| WO | 9715050     | 4/1997  |

OTHER PUBLICATIONS

Japanese Office Action from corresponding Japanese Patent Application No. 2002-105750.

* cited by examiner

OPTICAL DISC AND METHOD OF IDENTIFYING RECORDING LAYER

CROSS REFERENCE TO RELATED APPLICATIONS

This application is a continuation application of U.S. patent application Ser. No. 10/099,946, filed on Mar. 19, 2002, currently pending, which claims the benefit of Korean Application No. 2001-18472 filed Apr. 7, 2001 in the Korean Patent Office, the disclosures of which are incorporated herein by reference.

BACKGROUND OF THE INVENTION

1. Field of the Invention

The present invention relates to an optical disc and a method of identifying a recording layer, and more particularly, to a recordable and/or reproducible optical disc, in which a physical address of smallest recording units and an address of the smallest recording units recorded during recording of data on the disc increase or decrease on first and second recording layers, and a method of identifying the recording layers without recording information about each recording layer.

2. Description of the Related Art

In an optical disc drive, physical identification data (PID) refers to information recorded for identifying a physical location on a disc whose data is to be reproduced. In general, PID is physical sector address information recorded on a recordable and/or reproducible medium on which data is recordable and/or reproducible per sector. PID is used to record data at an arbitrary position on a disc and to locate the recording position. A read-only memory (ROM) disc records addresses by using predetermined bits in an ID region of a header area of a sector that is the smallest unit of data that is recordable on a disc.

Referring to FIG. 1A showing a conventional parallel spiral track disc having dual layers, first and second layer L0-1 and L1-1 have the same track spiral direction. Here, as shown in FIG. 1B, sector addresses on the first and second layers L0-1 and L1-1 increase from an inner radius Rin of a disc to an outer radius Rout of the disc, respectively. In a case of continuous reproduction, data recorded on the first layer L0-1 of the disc is reproduced from the inner radius of the first layer L0-1 to the outer radius of the first layer and then data recorded on the second layers L1-1 of the disc is reproduced from the inner radius of the second layer L1-1 to the outer radius of the second layer L1-1. Because a pickup of a reproduction apparatus must move back toward the inner radius Rin of the disc in order to reproduce data from the second layer L1-1 successively after the first layer L0-1, an additional access time due to time for this movement as well as a decrease in linear velocity as shown in FIG. 1C is required.

To compensate for this, as shown in FIG. 2A, first and second layers L0-1 and L1-1 have opposite spiral directions. Furthermore, sector addresses on the first layer L0-1 increase from the inner radius Rin of the disc to the outer radius Rout, while sector addresses on the second layer L1-1 successively increase from the outer radius Rout to the inner radius Rin, thereby reducing a time taken to access from the first layer L0-1 to the second layer L1-1. This is called an opposite spiral track path. In particular, U.S. Pat. No. 5,881,032 discloses an optical disc in which sector addresses are arranged for a plurality of recording layers.

In a conventional DVD dual layer disc, first and second layers L0 and L1 are identifiable using predetermined bits in an ID region of a header area at the beginning of a sector that is the smallest unit that can be recorded on the disc. However, if a recordable disc is to store information about sectors and layers in a wobble on a groove track, repeated recording may degrade characteristics of the wobble so that the information about sectors or layers is not detectable. For example, a DVD-RAM stores address information including layer information in a header area in the form of pits before recording data. However, the layer information is repeatedly recorded in a data identification data (DID) region during actual recording. This is because physical addresses are needed for recording data and more reliable addressing is achieved. However, repeatedly recording the layer information results in overhead according to high density recording.

Thus, it is highly desirable to have a dual layer disc as a recordable and/or reproducible optical disc and to effectively record information other than user data for high density recording.

SUMMARY OF THE INVENTION

To solve the above problems, it is an object of the present invention to provide an optical disc having first and second recording layers on which a physical address of smallest recording units and an address of the smallest recording units recorded while recording on the disc are recorded, and a method of identifying a recording layer by using an increase or decrease in the physical address and the recorded address.

Additional objects and advantages of the invention will be set forth in part in the description which follows, and, in part, will be obvious from the description, or may be learned by practice of the invention.

Accordingly, to achieve the above and other objects of the invention, the present invention provides an optical disc comprising first and second recording layers on which data are recordable and/or reproducible, the first and second recording layers having a same track spiral direction, wherein a physical address of smallest recording units increases or decreases together with an address of the smallest recording units recorded while recording on the disc, from an inner radius of the first recording layer to an outer radius of the first recording layer.

On the second recording layer, the physical address increases or decreases together with the recorded address from an inner radius of the second recording layer to an outer radius of the second recording layer.

The present invention also provides an optical disc comprising first and second recording layers on which data are recordable and/or reproducible, the first and second recording layers having a same track spiral direction, wherein an address of smallest recording units recorded while recording the disc decreases as a physical address of the smallest recording units increases and the recorded address increases as the physical address decreases, from an inner radius of the first recording layer to an outer radius of the first recording layer.

On the second recording layer, the physical address increases or decreases together with the recorded address from an inner radius of the second recording layer to an outer radius of the second recording layer.

Alternatively, on the second recording layer, the recorded address decreases as the physical address increases and increases as the physical address decreases, from an inner radius of the second recording layer to an outer radius of the second recording layer.

The present invention provides an optical disc comprising first and second recording layers on which data are recordable and/or reproducible, the first and second recording layers having opposite track spiral directions, wherein a physical address of smallest recording units increases or decreases together with an address of the smallest recording units recorded during recording on the disc.

The present invention also provides an optical disc comprising first and second recording layers on which data are recordable and/or reproducible, the first and second recording layers having opposite track spiral directions, wherein, on the first recording layer, an address of smallest recording units recorded while recording data on the disc decreases as a physical address of the smallest recording units increases and increases as the physical address decreases.

On the second recording layer, the physical address increases or decreases together with the recorded address.

The present invention also provides a method of identifying a recording layer on an optical disc comprising first and second recording layers on which data are recordable and/or reproducible, the first and second recording layers having the same track spiral direction. The method comprises assigning first smallest recording units on the first recording layer a physical address which is different from a physical address of second smallest recording units on the second recording layer.

To achieve the above and other objects, an optical disc comprises at least two recording layers on which data are recordable and/or reproducible, wherein a physical address of smallest recording units and an address of the smallest recording units recorded during recording data on the disc increase or decrease on the at least two recording layers. Alternatively, the physical address and the recorded address increase or decrease in different ways for each of the at least two recording layers. The at least two recording layers may have the same track spiral direction or alternately may have opposite track spiral directions.

BRIEF DESCRIPTION OF THE DRAWINGS

The above objects and advantages of the present invention will become more apparent by describing in detail embodiments thereof with reference to the accompanying drawings in which.

DESCRIPTION OF THE PREFERRED EMBODIMENTS

Figure 1A:
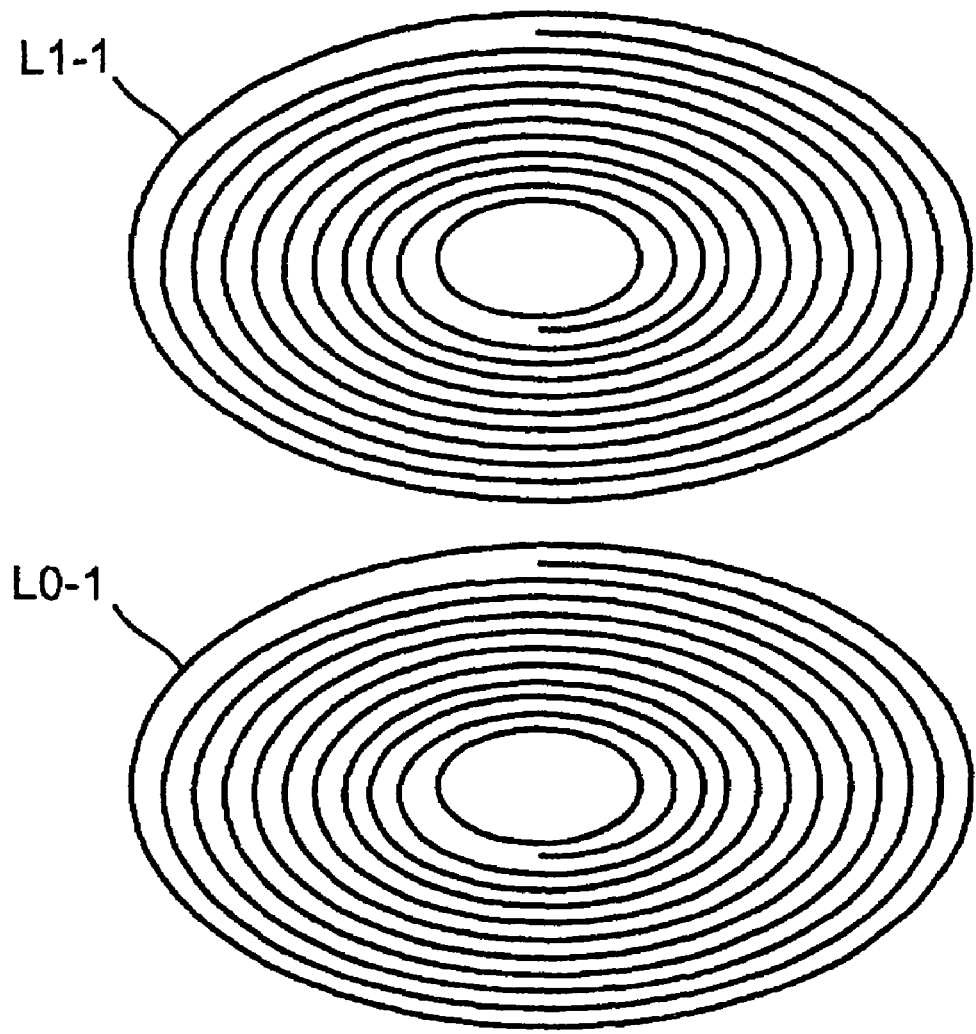
FIG. 1A schematically shows spiral directions of a parallel spiral track optical disc.
Figure 1B:
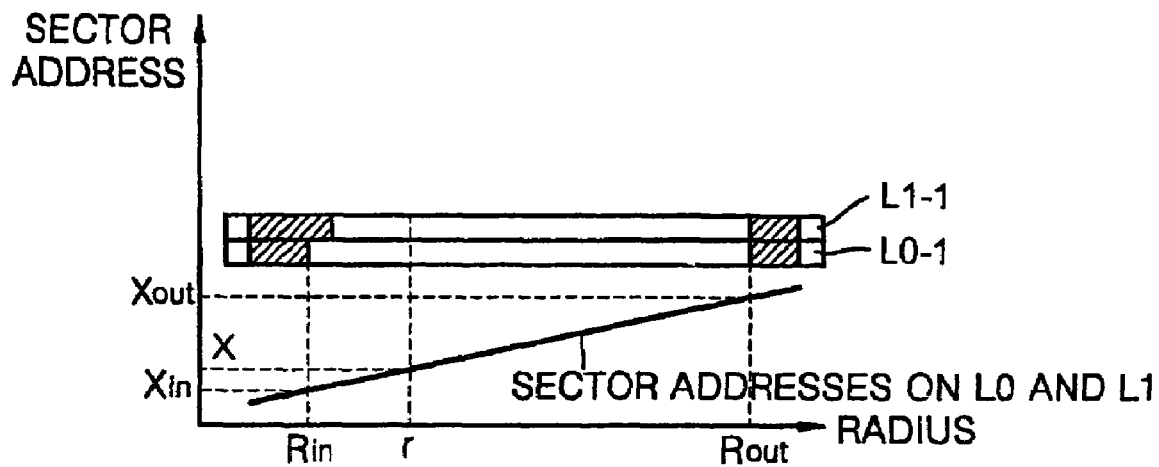
FIG. 1B illustrates an example in which sector addresses are recorded in a conventional optical disc for reproduction.
Figure 1C:
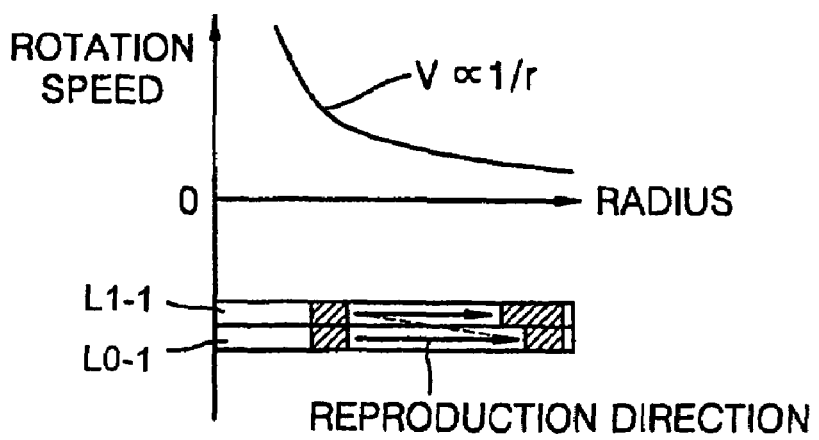
FIG. 1C shows changes in the rotation speed of a disc and reproduction direction with respect to a radius of the disc where reproducing data from a conventional optical disc for reproduction.
Figure 2A:
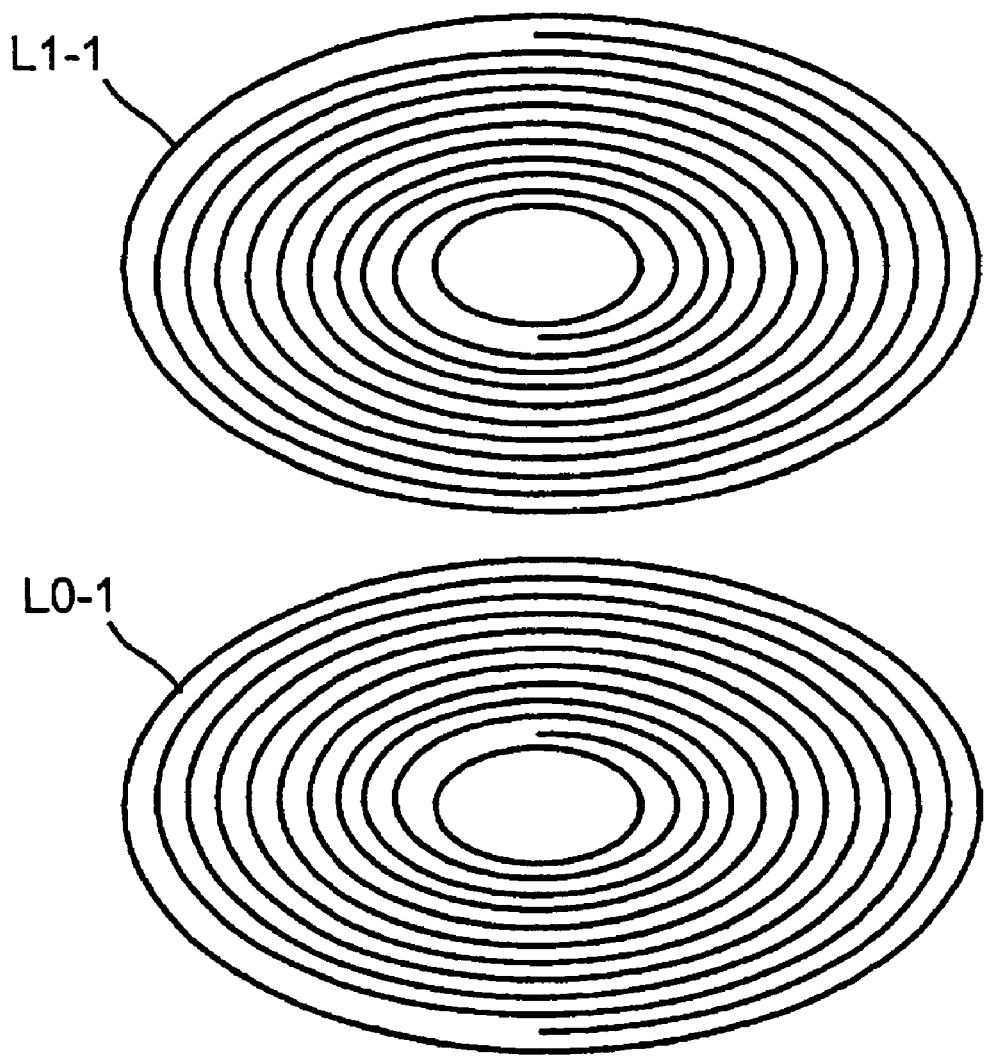
FIG. 2A schematically shows spiral directions of an opposite spiral track optical disc.
Figure 2B:
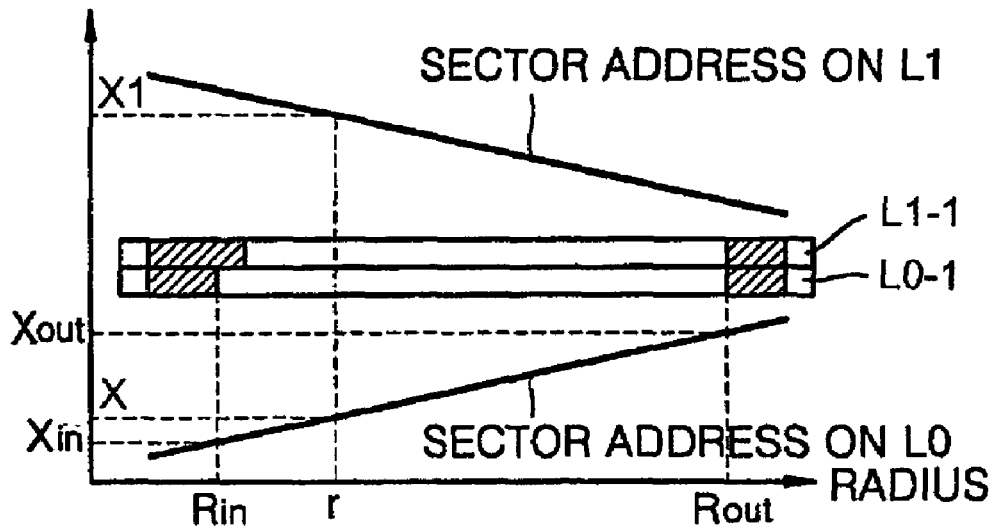
FIG. 2B illustrates another example in which sector addresses are recorded in a conventional optical disc for reproduction.
Figure 2C:
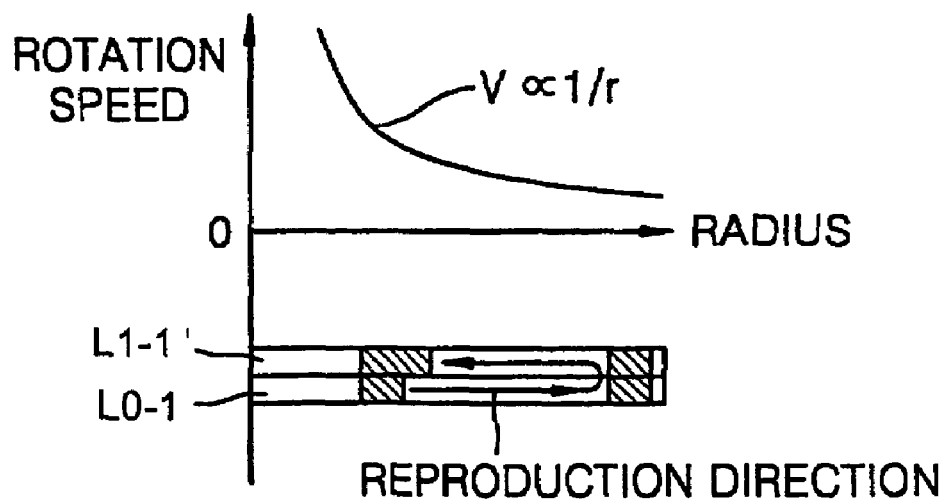
FIG. 2C shows changes in the rotation speed of a disc and reproduction direction with respect to a radius of the disc where reproducing data from a conventional optical disc for reproduction.
Figure 3A:
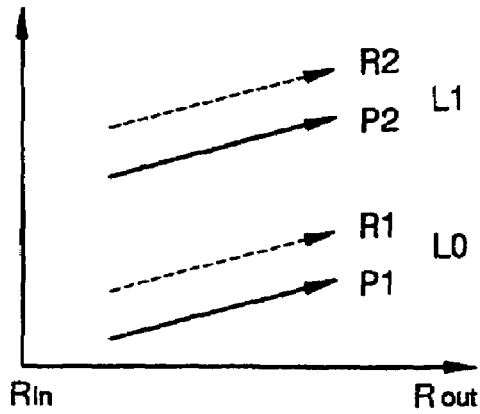
FIGS. 3A-3D graphically show a first set of directions in which physical addresses and addresses recorded during recording increase or decrease in a parallel spiral track optical disc according to a first embodiment of the present invention.
Figure 3B:
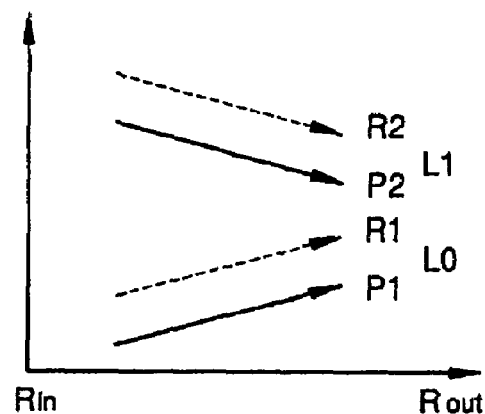
Figure 3D:
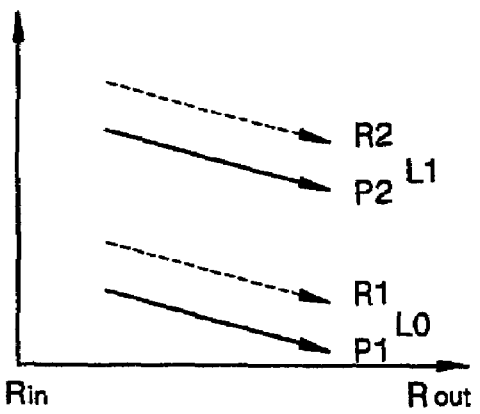
Figure 3C:
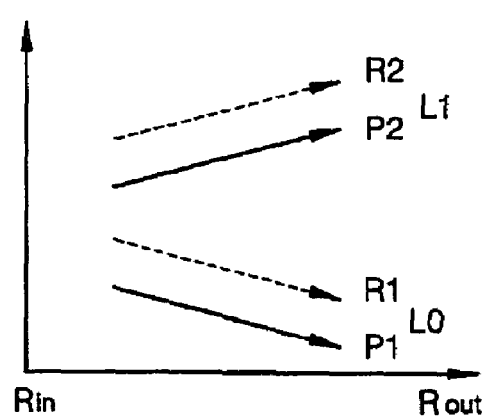
Figure 4A:
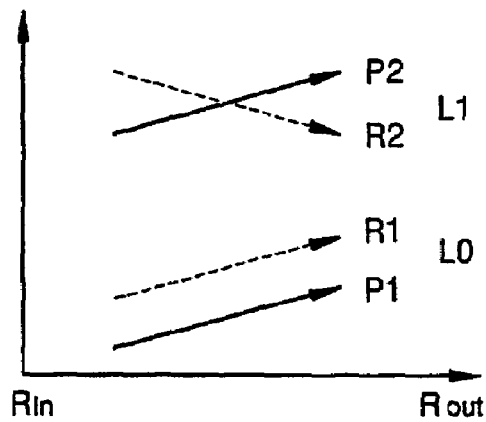
FIGS. 4A-4D graphically show a second set of directions in which physical addresses and addresses recorded during recording increase or decrease in a parallel spiral track optical disc according to the first embodiment of the present invention.
Figure 4B:
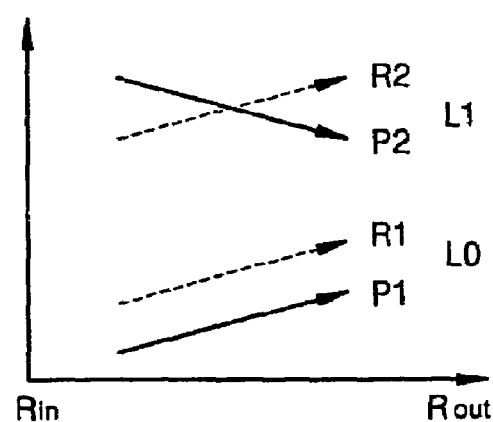
Figure 4D:
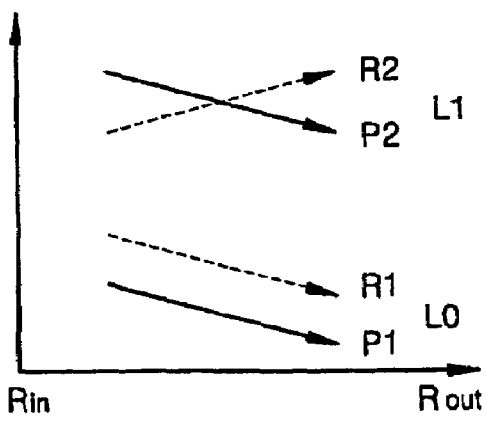
Figure 4C:
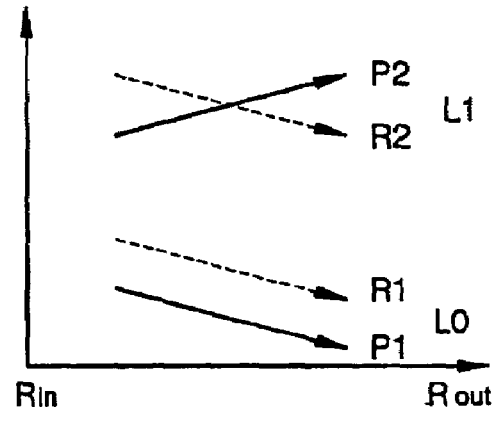
Figure 5A:
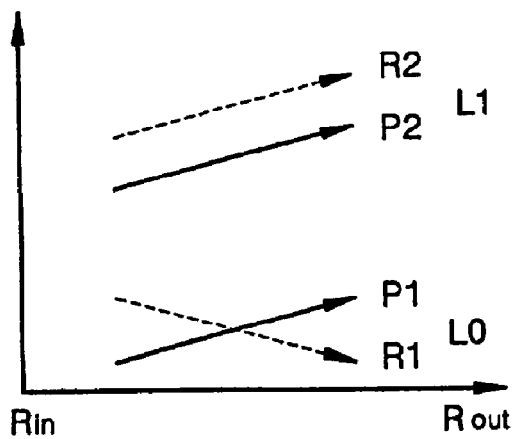
FIGS. 5A-5D graphically show a third set of directions in which physical addresses and addresses recorded during recording increase or decrease in a parallel spiral track optical disc according to the first embodiment of the present invention.
Figure 5B:
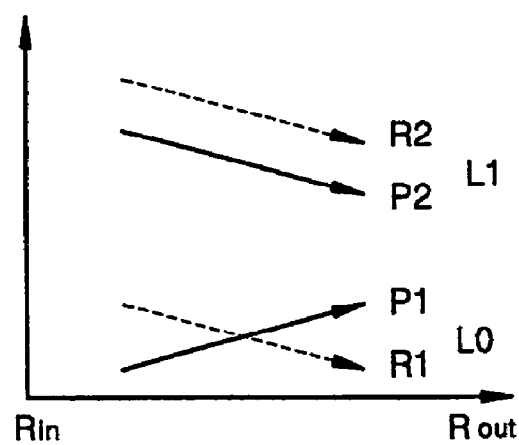
Figure 5D:
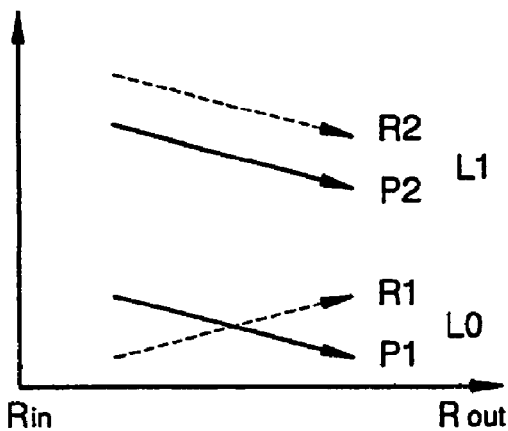
Figure 5C:
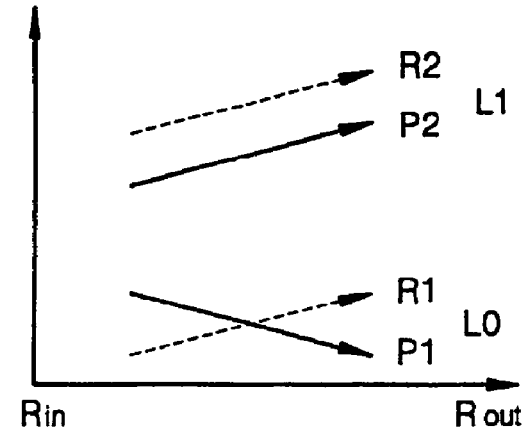

Reference will now be made in detail to the present embodiments of the present invention, examples of which are illustrated in the accompanying drawings, wherein like reference numerals refer to like elements throughout.

An optical disc according to the present invention is a recordable and/or reproducible disc having first and second recording layers L0 and L1. The first and second recording layers L0 and L1 have physical addresses of smallest recording units and addresses of the smallest recording units recorded during recording (recorded addresses).

An optical disc according to a first embodiment of the present invention comprises a parallel spiral track optical disc in which first and second recording layers L0 and L1 have the same spiral direction. In the parallel spiral track optical disc, a physical address P1 and an address R1 recorded while recording to the disc (hereinafter called "recorded address R1") increase or decrease from an inner radius Rin of the first recording layer L0 to an outer radius Rout of the first recording layer L0, while a physical address P2 and an address R2 recorded while recording to the disc (hereinafter called "recorded address R2") continuously increase or decrease from an inner radius Rin of the second recording layer L1 to an outer radius Rout of the second recording layer.

Referring to FIGS. 3A-3D, in a first arrangement of the first embodiment, the first and second recording layers L0 and L1, the physical addresses P1 and P2 increase or decrease together with the recorded addresses R1 and R2, respectively. That is, the physical address P1 increases or decreases together with the recorded address R1 in the first recording layer L0 and the physical address P2 increases or decreases together with the recorded address R2 in the second recording layer L1.

In a second arrangement of the first embodiment, as shown in FIGS. 4A-4D, the physical address P1 increases or decreases together with the recorded address R1 in the first recording layer L0 and the recorded address R2 decreases as the physical address P2 increases and the recorded address R2 increases as the physical address P2 decreases, in the second recording layer L1. That is, as shown in an example of FIG. 4A, the physical address P1 increases together with the recorded address R1 from the inner radius Rin of the first recording layer L0 to the outer radius Rout and the physical address P2 increases and the recorded address R2 decreases from the inner radius Rin of the second recording layer L1 to the outer radius Rout.

In a third arrangement of the first embodiment, as shown in FIGS. 5A-5D, the recorded address R1 decreases as the physical address P1 increases and the recorded address R1 increases as the physical address P1 decreases, in the first recording layer L0 and the physical address P2 increases or decreases together with the recorded address R2 in the second recording layer L2. That is, as shown in examples of FIGS. 5A and 5B, the physical address P1 increases and the recorded layer R1 decreases from the inner radius Rin of the first recording layer L0 to the outer radius Rout, while the physical address P2 increases (FIG. 5A) or decreases (FIG. 5B) together with the recorded address R2 from the inner radius Rin of the second recording layer L1 to the outer radius Rout.

In a fourth arrangement of the first embodiment, as shown in FIGS. 6A-6D, the recorded address R1 increases as the physical address P1 decreases or the recorded address R1 decreases as the physical address P1 increases, in the first recording layer L0, and the recorded address R2 decreases as the physical address P2 increases or the recorded address R2 increases as the physical address P2 decreases, in the second recording layer L1.

Figure 6A:
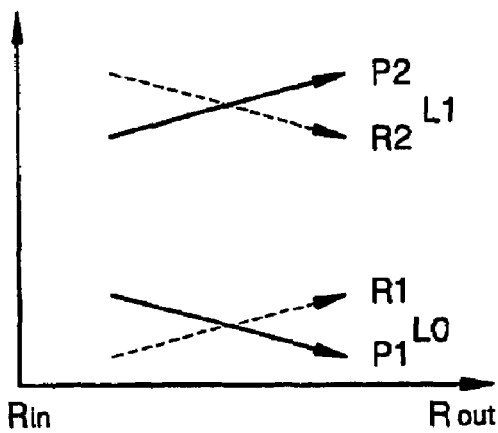
FIGS. 6A-6D graphically show a fourth set of directions in which physical addresses and addresses recorded during recording increase or decrease in a parallel spiral track optical disc according to the first embodiment of the present invention.

For example, as shown in FIG. 6A, the physical address P1 decreases and the recorded address R1 increases from the inner radius Rin of the first recording layer L0 to the outer radius Rout and the physical address P2 increases and the recorded address R2 decreases from the inner radius Rin of the second recording layer L1 to the outer radius Rout.

Figure 6B:
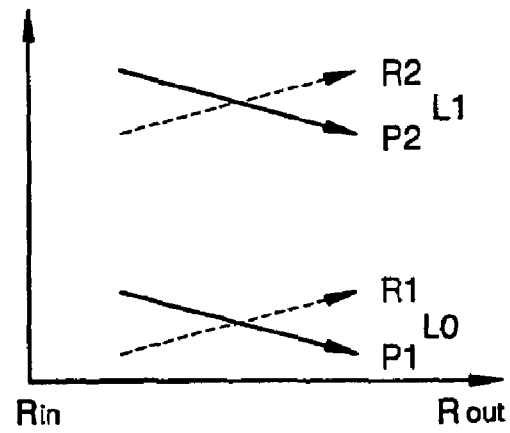
Figure 6D:
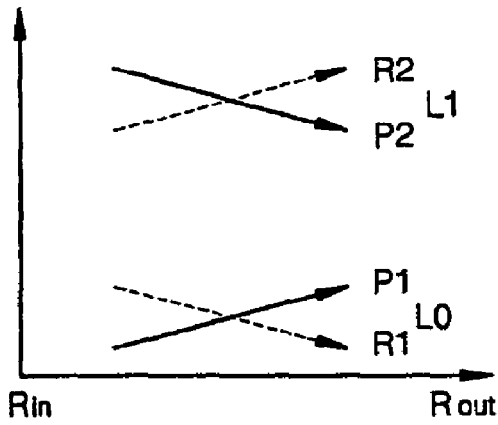
Figure 6C:
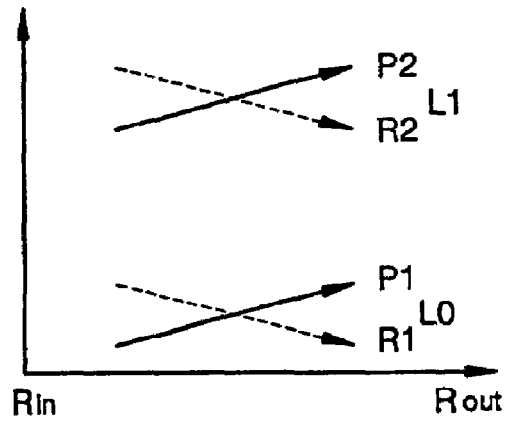

In another example, as shown in FIG. 6B, the physical address P1 decreases and the recorded address R2 increases from the inner radius Rin of the first recording layer L0 to the outer radius Rout and the physical address P2 decreases and the recorded address R2 increases from the inner radius Rin of the second recording layer L1 to the outer radius Rout of the second recording layer. In the examples described above, the physical addresses P1 and P2 are recordable by pits at a front portion of the smallest recording unit. Alternatively, the physical addresses P1 and P2 are recordable in a form of a wobble on the track.

Opposite spiral track optical discs according to second and third embodiments of the present invention, each comprising first and second recording layers L0 and L1 having opposite spiral directions, will now be described.

Referring now to FIGS. 7A-7D, an opposite spiral track optical disc according to the second embodiment of the present invention is a recordable and/or reproducible disc having first and second recording layers L0 and L1. In the second embodiment a physical address P1 and a recorded address R1 increase or decrease from an inner radius Rin of the first recording layer L0 to an outer radius Rout of the first recording layer L0 and a physical address P2 and a recorded address R2 continuously increase or decrease from an outer radius Rout of the second recording layer L1 to an inner radius Rin of the second recording layer.

Referring now to FIGS. 8A-8D, an opposite spiral track optical disc according to a third embodiment of the present invention is a recordable and/or reproducible disc having first and second recording layers L0 and L1. In the third embodiment, a physical address P1 and a recorded address R1 increase or decrease from the outer radius Rout of the first recording layer L0 to the inner radius Rin while a physical address P2 and a recorded address R2 continuously increase or decrease from the inner radius Rin of the second recording layer L1 to the outer radius Rout.

Figure 7A:
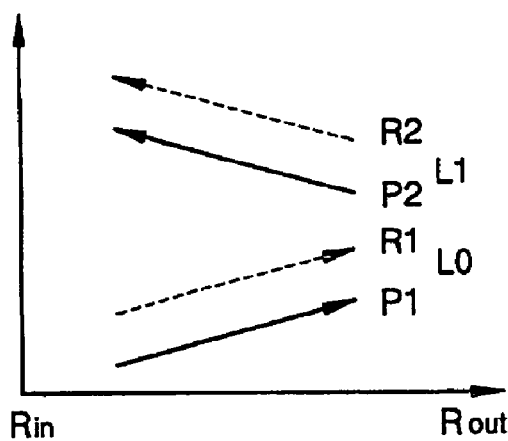
FIGS. 7A-7D graphically show a set of directions in which physical addresses and addresses recorded during recording increase or decrease in an opposite spiral track optical disc according to a second embodiment of the present invention.

All arrangements applied to the parallel spiral track optical disc according to the first embodiment of the present invention are also applicable to the opposite spiral track optical discs according to the second and third embodiments of the invention. First, in the first opposite spiral track optical disc, the physical address P1 increases or decreases together with the recorded address R1 from the inner radius Rin of the first recording layer L0 to the outer radius Rout, while the physical address P2 increases or decreases together with the recorded address R2 from the outer radius Rout of the second recording layer L1 to the inner radius Rin. For example, as shown in FIG. 7A, the physical address P1 increases with the recorded address R1 from the inner radius Rin of the first recording layer L0 to the outer radius Rout, while the physical address P2 increases together with the recorded address R2 from the outer radius Rout of the second recording layer L1 to the inner radius Rin.

Figure 8A:
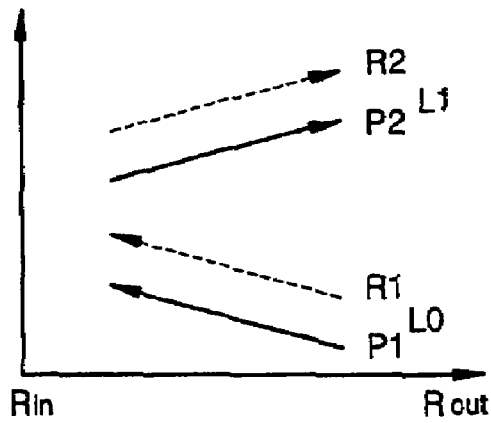
FIGS. 8A-8D graphically show a set of directions in which physical addresses and addresses recorded during recording increase or decrease in an opposite spiral track optical disc according to a third embodiment of the present invention.

In the opposite spiral track optical disc according to the second embodiment of the present invention, the physical address P1 increases or decreases together with the recorded address R1 from the outer radius Rout of the first recording layer L0 to the inner radius Rin and the physical address P2 increases or decreases together with the recorded address R2 from the inner radius Rin of the second recording layer L1 to the outer radius Rout, corresponding to the increase or decrease of the physical address P1 and the recorded address R1, respectively. For example, as shown in FIG. 8A, the physical address P1 increases together with the recorded address R1 from the outer radius Rout of the first recording layer L0 to the inner radius Rin and the physical address P2 increases together with the recorded address R2 from the inner radius Rin of the second recording layer L1 to the outer radius Rout.

Figure 7B:
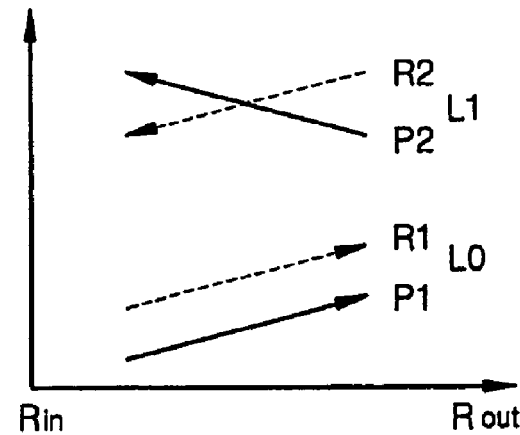

In the opposite spiral track optical disc according to the second embodiment, the physical address P1 increases or decreases together with the recorded address R1 from the inner radius Rin of the first recording layer L0 to the outer radius Rout and the recorded address R2 decreases as the physical address P2 increases and the recorded address R2 increases as the physical address P2 decreases, from the outer radius Rout of the second recording layer L1 to the inner radius Rin. For example, as shown in FIG. 7B, the physical address P1 increases together with the recorded address R1 from the inner radius Rin to the outer radius Rout and the physical address P2 increases and the recorded address R2 decreases from the outer radius Rout of the second recording layer L1.

Figure 8B:
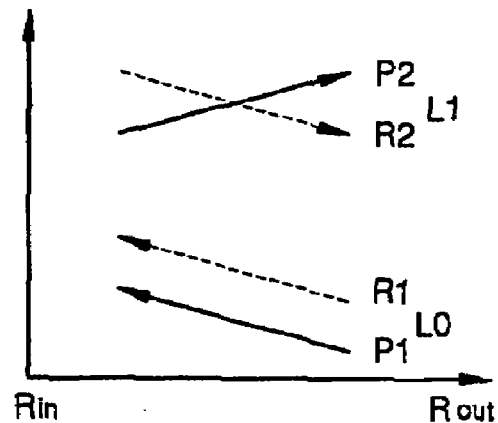

Similarly, in the opposite spiral track optical disc according to the third embodiment, the physical address P1 may increase or decrease together with the recorded address R1 from the outer radius Rout of the first recording layer L0 to the inner radius Rin and the recorded address R2 decreases as the physical address P2 increases and the recorded address R2 increases as the physical address P2 decreases, from the inner radius Rin of the second recording layer L1 to the outer radius Rout. An example thereof is shown in FIG. 8B.

Further, in the opposite spiral track optical disc according to the second embodiment, the recorded address R1 may decrease as the physical address P1 increases and increase as the physical address P1 decreases, from the inner radius Rin of the first recording layer L0 to the outer radius Rout. On the other hand, the physical address P2 may increase or decrease together with the recorded address R2 from the outer radius Rout of the second recording layer L1 to the inner radius Rin. An example thereof is shown in FIG. 7C.

Similarly, in the opposite spiral track optical disc according to the third embodiment, the recorded address R1 may decrease as the physical address P1 increases or increase as the physical address P1 decreases, from the outer radius Rout of the first recording layer L0 to the inner radius Rin. On the other hand, the physical address P2 may increase or decrease together with the recorded address R2 from the inner radius Rin of the second recording layer L1 to the outer radius Rout. An example thereof is shown in FIG. 8C.

Figure 7D:
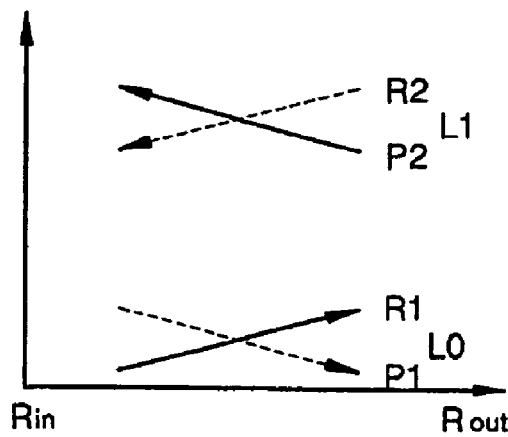
Figure 7C:
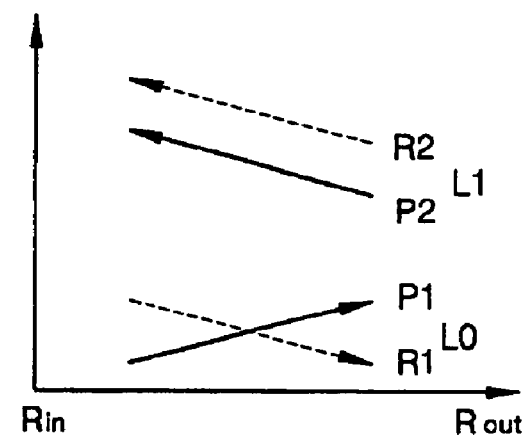

In the opposite spiral track optical disc according to the second embodiment, as shown in FIG. 7D, the recorded address R1 may decrease as the physical address P1 increases and increase as the physical address P1 decreases, from the inner radius Rin of the first recording layer L0 to the outer radius Rout. At the same time, the recorded address R2 decreases as the physical address P2 increases and increases as the physical address P2 decreases, from the outer radius Rout of the second recording layer L1 to the inner radius Rin.

Figure 8D:
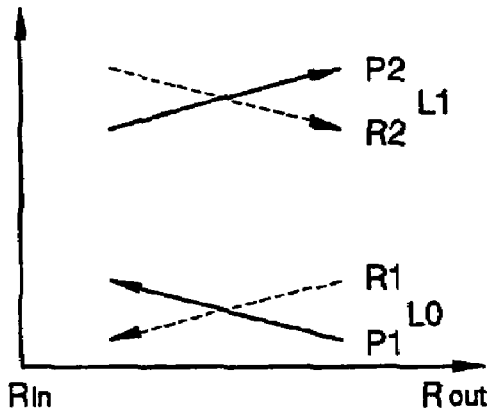
Figure 8C:
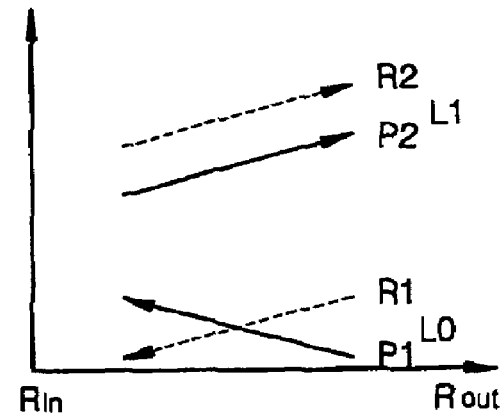

In the opposite spiral track optical disc according to the third embodiment, as shown in FIG. 8D, the recorded address R1 decreases as the physical address P1 increases and increases as the physical address P1 decreases, from the outer radius Rout of the first recording layer L0 to the inner radius Rin. At the same time, the recorded address R2 decreases as the physical address P2 increases and increases as the physical address P2 decreases, from the inner radius Rin of the second recording layer L1 to the outer radius Rout.

Where the parallel spiral track optical disc is compared with the opposite spiral track optical discs of the second and third embodiments, the opposite spiral track optical discs of the second and third embodiments differ from the parallel spiral track optical disc of the first embodiment in that the direction in which the physical address P1 or the recorded address R1 provided to the first recording layer L0 increases or decreases is opposite to that in which the corresponding physical address P2 or the recorded address R2 provided to the second recording layer L1 increases or decreases. The same is true of the arrangement of physical addresses and recorded addresses made depending on an increase or a decrease in the addresses in the opposite spiral track optical discs according to the second and third embodiments. Thus, all arrangements in the parallel spiral track optical disc according to the first embodiment of the present invention are applicable to the opposite spiral track optical discs according to the second and third embodiments, and thus detailed descriptions thereof will be omitted.

Furthermore, the arrangements of physical addresses and recorded addresses described above are applicable to an optical disc having two or more recording layers. That is, a physical address and a recorded address increase or decrease for each recording layer in the optical disc having two or more recording layers. Thus, an increase or decrease in a physical address and a recorded address for each recording layer are combinable in various ways. Here, the two or more recording layers may have the same track spiral direction or alternately have opposite track spiral directions.

All possible cases where physical addresses and recorded addresses in first and second recording layers are arrangeable according to an increase or decrease in the addresses and the direction in which such an increase or decrease is made are represented by ordered pairs. Here, the first and second recording layers are represented by 1 and 2, respectively, physical and recorded addresses are represented by P and R, respectively, and an increase and a decrease in those addresses are represented by i and d, respectively. For example, {(1Pi,1Ri)(2Pi,2Ri)} refers to a case in which physical addresses P and recorded addresses R on the first and second recording layers 1 and 2 all increase, as shown below:

| | |
|---|---|
| {(1Pi, 1Ri) (2Pi, 2Ri)} | {(1Pi, 1Ri) (2Pd, 2Rd)} |
| {(1Pd, 1Rd) (2Pi, 2Ri)} | {(1Pd, 1Rd) (2Pd, 2Rd)} |
| {(1Pi, 1Ri) (2Pi, 2Rd)} | {(1Pi, 1Ri) (2Pd, 2Ri)} |
| {(1Pd, 1Rd) (2Pi, 2Rd)} | {(1Pd, 1Rd) (2Pd, 2Ri)} |
| {(1Pi, 1Rd) (2Pi, 2Ri)} | {(1Pi, 1Rd) (2Pd, 2Rd)} |
| {(1Pd, 1Ri) (2Pi, 2Ri)} | {(1Pd, 1Ri) (2Pd, 2Rd)} |
| {(1Pd, 1Ri) (2Pi, 2Rd)} | {(1Pd, 1Ri) (2Pd, 2Ri)} |
| {(1Pi, 1Rd) (2Pi, 2Rd)} | {(1Pi, 1Rd) (2Pd, 2Ri)} |
| {(1Pi, 1Rd) (2Pd, 2Ri)} | {(1Pd, 1Ri) (2Pd, 2Ri)} |

The above arrangements may be applied to the recordable parallel spiral track disc according to the first embodiment and the opposite spiral track discs according to the second and third embodiments. The physical addresses P1 and P2 may be recorded in the form of pits at the front of each smallest recording unit or may be recorded in the form of a wobble on a track.

A method of identifying recording layers on a recordable and/or reproducible optical disc having first and second recording layers L0 and L1 according to the present invention will now be described. The method of identifying recording layers according to the present invention on an optical disc comprises making an increase or decrease in physical addresses P1 and P2 on the first and second recording layers L0 and L1 different. That is, the first and second recording layers L0 and L1 are identified by increasing the physical address P1 on the first recording layer L0 while decreasing the physical address P2 on the second recording layer L1, or by decreasing the physical address P1 on the first recording layer L0 while increasing the physical address P2 on the second recording layer L1. The present invention uses an increase or decrease in a physical address to identify a recording layer, thereby allowing for the effective use of a user data area since there is no need to separately record information about the recording layer.

An optical disc according to the present invention provides a dual layer disc having first and second recording layers L0 and L1 on which data are recordable and eraseable, and from which data are reproducible, in order to meet a strong demand for high density optical discs. Furthermore, the method of identifying recording layers on an optical disc according to the present invention allows recording layers to be identified by making increases or decreases in physical addresses in the recording layers different. This eliminates a need to repeatedly record information about the recording layers and thus increases the effective use of a user data area.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A reproducing apparatus comprising a pickup to reproduce data from an optical disc, wherein:
   the optical disc comprises first and second recording layers from which the pickup reproduces the data,
   the first and second recording layers have a same track spiral direction, and
   on the first recording layer, physical addresses of smallest recording units increase or decrease together with recording addresses of the smallest recording units recorded while recording on the disc, from an inner radius of the first recording layer to an outer radius of the first recording layer so as to define a first trend such that the reproducing apparatus identifies the first recording layer as being the first recording layer due to the first trend of the physical and recording addresses as compared to a second trend of other physical and recording addresses which identifies the second recording layer.

2. The apparatus of claim 1, wherein, on the second recording layer, the second trend comprises:
   the other physical addresses increasing or decreasing together with the other recorded addresses from an inner radius of the second recording layer to an outer radius of the second recording layer such that the apparatus identifies the second recording layer as being other than the first recording layer due to the second trend.

3. The apparatus of claim 1, wherein, on the second recording layer, the second trend comprises:
   the other recorded addresses decreasing as the other physical addresses increase or increasing as the other physical addresses decrease, from an inner radius of the second recording layer to an outer radius of the second recording layer.

4. The apparatus of claim 1, wherein the physical addresses are recorded in a form of pits at a front portion of each smallest recording unit.

5. The apparatus of claim 1, wherein the physical addresses are recorded on a track in the form of a wobble.

6. A reproducing apparatus comprising a pickup to reproduce data from an optical disc, wherein:
   the optical disc comprises first and second recording layers from which the pickup reproduces the data,
   the first and second recording layers have a same track spiral direction, and
   on the first recording layer, recording addresses of smallest recording units recorded while recording the disc decrease as physical addresses of the smallest recording units increase or increase as the physical addresses decrease, from an inner radius of the first recording layer to an outer radius of the first recording layer so as to define a first trend used by the apparatus to identify the first recording layer and distinguish the first recording layer from the second recording layer.

7. The apparatus of claim 6, wherein, on the second recording layer, other physical addresses increase or decrease together with other recording addresses from an inner radius of the second recording layer to an outer radius of the second recording layer to define a second trend used by the apparatus to identify the second recording layer and distinguish the second recording layer from the first recording layer.

8. The apparatus of claim 7, wherein the physical address is recorded in a form of pits at the front of each smallest recording unit.

9. The apparatus of claim 7, wherein the physical address is recorded on a track in a form of a wobble.

10. The apparatus of claim 6, wherein, on the second recording layer, other recording addresses decrease as other physical addresses increase or increase as the other physical addresses decrease, from an inner radius of the second recording layer to an outer radius of the second recording layer to define a second trend used by the apparatus to identify the second recording layer and distinguish the second recording layer from the first recording layer.

11. The apparatus of claim 10, wherein the physical address is recorded in a form of pits at the front of each smallest recording unit.

12. The apparatus of claim 10, wherein the physical address is recorded on a track in a form of a wobble.

13. The apparatus of claim 6, wherein the physical address is recorded in a form of pits at a front portion of each smallest recording unit.

14. The apparatus of claim 6, wherein the physical address is recorded on a track in a form of a wobble.

15. A reproducing apparatus comprising a pickup to reproduce data from an optical disc, wherein:
   the optical disc comprises first and second recording layers from which the pickup reproduces the data,
   the first and second recording layers have opposite track spiral directions, and
   physical addresses of smallest recording units on the first and second recording layers increase or decrease together with recording addresses of the smallest recording units recorded during recording on the disc so as to define a first trend used by the apparatus to identify the first recording layer and distinguish the first recording layer from the second recording layer.

16. The apparatus of claim 15, wherein the physical addresses increase or decrease together with recording addresses on the second recording layer to define a second trend used by the apparatus to identify the first recording layer and distinguish the first recording layer from the second recording layer.

17. The apparatus of claim 15, wherein the recording addresses decrease as the physical addresses increase or increase as the physical addresses decrease on the second recording layer to define a second trend used by the apparatus to identify the first recording layer and distinguish the first recording layer from the second recording layer.

18. The apparatus of claim 15, wherein:
   on the first recording layer, the physical addresses and the recording addresses increase or decrease from an inner radius of the first recording layer to an outer radius of the first recording layer to define the first trend used by the apparatus to identify the first recording layer; and
   on the second recording layer, the physical addresses and the recording addresses increase or decrease from an outer radius of the second recording layer to an inner radius of the second recording layer to define a second trend used by the apparatus to identify the second recording layer.

19. The apparatus of claim 15, wherein:
   on the first recording layer, the physical addresses and the recording addresses increase or decrease from an outer radius of the first recording layer to an inner radius of the first recording layer to define the first trend used by the apparatus to identify the first recording layer; and
   on the second recording layer, the physical addresses and the recording addresses increase or decrease from an inner radius of the second recording layer to an outer radius of the second recording layer to define a second trend used by the apparatus to identify the second recording layer.

20. A reproducing apparatus comprising a pickup to reproduce data from an optical disc, wherein:
the optical disc comprises first and second recording layers from which the pickup reproduces the data,
the first and second recording layers have opposite track spiral directions,
a first trend on the first recording layer in which recording addresses of smallest recording units recorded while recording data on the disc decrease as physical addresses of the smallest recording units increase or increase as the physical addresses decrease and a second trend on the second recording layer,
wherein the apparatus identifies the first recording layer as distinguished from the second recording layer based on the first and second trends.

21. The apparatus of claim 20, wherein the second trend on the second recording layer comprises:
other physical addresses increasing or decreasing together with other recording addresses such that the apparatus identifies the second recording layer as distinguished from the first recording layer.

22. The apparatus of claim 20, wherein the second trend on the second recording layer comprises:
other recording addresses decreasing as other physical addresses increase or increasing as the other physical addresses decrease such that the apparatus identifies the second recording layer as distinguished from the first recording layer.

23. The apparatus of claim 20, wherein:
the first trend on the first recording layer comprises:
the physical addresses and the recording addresses increasing or decreasing from an inner radius of the first recording layer to an outer radius of the first recording layer such that the apparatus identifies the first recording layer as distinguished from the second recording layer, and
the second trend on the second recording layer comprises:
other physical addresses and other recording addresses increasing or decreasing from an outer radius of the second recording layer to an inner radius of the second recording layer such that the apparatus identifies the second recording layer as distinguished from the first recording layer.

24. The apparatus of claim 20, wherein:
the first trend on the first recording layer comprises:
the physical addresses and the recording addresses increasing or decreasing from an outer radius of the first recording layer to an inner radius of the firs recording layer such that the apparatus identifies the first recording layer as distinguished from the second recording layer, and
the second trend on the second recording layer comprises:
other physical addresses and other recording addresses increasing or decreasing from an inner radius of the second recording layer to an outer radius of the second recording layer such that the apparatus identifies the second recording layer as distinguished from the first recording layer.

25. A method of reproducing data from an optical disc comprising first and second recording layers on which data are recordable and/or reproducible, the method comprising:
identifying a recording layer to be reproduced as being either the first or the second recording layer according to whether recording addresses of smallest recording units recorded while recording data on the disc decrease as physical addresses of the smallest recording units increase or the recording addresses increase as the physical addresses decrease so as to distinguish between the first and second recording layers, and
reproducing data from the identified recording layer.

26. The method of claim 25, wherein the physical addresses are recorded in a form of pits at a front portion of each smallest recording unit.

27. The method of claim 25, wherein the physical addresses are recorded on a track in a form of a wobble.

28. A method of reproducing data from an optical disc having first and second recording layers on which data are recordable and/or reproducible, the method comprising:
detecting addresses in respective front portions of smallest recording units of the first and second recording layers to detect first and second trends, the recording addresses and corresponding physical addresses of the first recording layer varying together according to a direction of travel on the disc to define the first trend, and the recording addresses and corresponding physical addresses of the second recording layer varying together according to the direction of travel to define the second trend;
identifying a recording layer as being the first recording layer if the first trend is detected and reproducing the data from the identified first recording layer; and
identifying a recording layer as being the second recording layer if the second trend is detected and reproducing the data from the identified second recording layer.

29. The method of claim 28, wherein the recording and physical addresses of the first recording layer and the recording and physical addresses of the
second recording layer all increase or all decrease together.

30. The method of claim 28, wherein:
the recording and physical addresses of the first recording layer increase together; and
the recording and physical addresses of the second recording layer decrease together.

31. The method of claim 28, wherein:
the recording and physical addresses of the first recording layer decrease together; and
the recording and physical addresses of the second recording layer increase together.

32. A method of reproducing data from an optical disc having first and second recording layers on which data are recordable and/or reproducible by a recording head, the method comprising:
identifying a recording layer to be reproduced as being either the first or the second recording layer according to detected trends of recording addresses and physical addresses in respective front portions of smallest recording units of the first and second recording layers, the recording addresses and the physical addresses of one of the first and second recording layers varying according to a direction of travel along the disc, and the recording addresses and the physical addresses of the other of the first and second recording layers varying oppositely according to the direction of travel; and
reproducing data from the identified recording layer.

33. The method of claim 32, wherein the detected trends comprise:
a first detected trend in which the recording and physical addresses of the first recording layer vary together, and a second detected trend in which the recording and physical addresses of the second recording layer vary oppositely.

34. The method of claim 32, wherein the detected trends comprise:
 a first detected trend in which the recording and physical addresses of the second recording layer vary together, and
 a second detected trend in which the recording and physical addresses of the first recording layer vary oppositely.

35. A method of reproducing data from an optical disc having first and second recording layers on which data are recordable and/or reproducible, the method comprising:

identifying a recording layer as being either the first or second recording layer according to detected trends of recording addresses and physical addresses in respective front portions of smallest recording units of the first and second recording layers, wherein the recording addresses and the physical addresses of one of the first and second recording layers vary oppositely according to a direction of travel along the disc, and the recording addresses and the physical addresses of the other of the first and second recording layers vary oppositely according to the direction of travel along the disc; and reproducing data from the identified recording layer.

* * * * *

UNITED STATES PATENT AND TRADEMARK OFFICE
CERTIFICATE OF CORRECTION

PATENT NO. : 7,324,420 B2
APPLICATION NO. : 11/204357
DATED : January 29, 2008
INVENTOR(S) : Kyung-geun Lee et al.

It is certified that error appears in the above-identified patent and that said Letters Patent is hereby corrected as shown below:

Column 11, line 14, insert --,-- before "and" and start a new paragraph after "and".

Column 11, line 51, change "firs" to --first--.

Signed and Sealed this

Twenty-seventh Day of May, 2008

JON W. DUDAS
*Director of the United States Patent and Trademark Office*